United States Patent
Takemoto et al.

(10) Patent No.: US 10,983,212 B2
(45) Date of Patent: Apr. 20, 2021

(54) DISTANCE MEASUREMENT DEVICE

(71) Applicant: Panasonic Intellectual Property Management Co., Ltd., Osaka (JP)

(72) Inventors: Masato Takemoto, Osaka (JP); Shinzo Koyama, Osaka (JP); Motonori Ishii, Osaka (JP); Shigeru Saitou, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 399 days.

(21) Appl. No.: 16/012,860

(22) Filed: Jun. 20, 2018

(65) Prior Publication Data

US 2018/0299553 A1 Oct. 18, 2018

Related U.S. Application Data

(63) Continuation of application No. PCT/JP2017/002435, filed on Jan. 25, 2017.

(30) Foreign Application Priority Data

Jan. 29, 2016 (JP) .................. 2016-016691

(51) Int. Cl.
*G01S 17/00* (2020.01)
*G01S 17/10* (2020.01)
(Continued)

(52) U.S. Cl.
CPC .............. *G01S 17/10* (2013.01); *G01S 7/484* (2013.01); *G01S 7/4865* (2013.01); *G01S 7/4876* (2013.01)

(58) Field of Classification Search
USPC ....................................... 356/5.01
See application file for complete search history.

(56) References Cited

U.S. PATENT DOCUMENTS

| | | | |
|---|---|---|---|
| 8,072,582 B2* | 12/2011 | Meneely | G01S 17/10 356/5.01 |
| 8,736,818 B2* | 5/2014 | Weimer | G01C 3/08 250/208.2 |

(Continued)

FOREIGN PATENT DOCUMENTS

| | | |
|---|---|---|
| EP | 2157445 A2 | 2/2010 |
| JP | H07-043468 A | 2/1995 |

(Continued)

OTHER PUBLICATIONS

Extended European Search Report issued in Application No. 17744226.6 dated Dec. 5, 2018.

(Continued)

*Primary Examiner* — James R Hulka
(74) *Attorney, Agent, or Firm* — McDermott Will & Emery LLP (57) ABSTRACT

A distance measurement device includes: a pulse light emitter that emits pulse light to a measurement target; an optical sensor that receives reflected light which is the pulse light reflected by the measurement target; and a controller that controls a light emission timing of the pulse light emitted by the pulse light emitter, and determines a distance to the measurement target, from a light reception timing of the reflected light detected by the optical sensor. The controller sets the light emission timing in each of N periods (N being a natural number less than K) selected randomly from continuous K periods (K being a natural number greater than or equal to 2) to a timing that is delayed by a random first time from a start time of the period.

7 Claims, 7 Drawing Sheets

(51) Int. Cl.
    *G01S 7/484*     (2006.01)
    *G01S 7/487*     (2006.01)
    *G01S 7/4865*     (2020.01)

(56) References Cited

U.S. PATENT DOCUMENTS

| | | | | |
|---|---|---|---|---|
| 9,702,975 | B2* | 7/2017 | Brinkmeyer | G01S 17/32 |
| 10,175,356 | B2* | 1/2019 | Hjelmstad | G01S 7/4911 |
| 2007/0215795 | A1* | 9/2007 | Kameyama | G01S 7/4802 |
| | | | | 250/222.2 |
| 2010/0045965 | A1* | 2/2010 | Meneely | G01S 17/10 |
| | | | | 356/5.01 |
| 2012/0038903 | A1* | 2/2012 | Weimer | G01C 3/08 |
| | | | | 356/4.07 |
| 2015/0301178 | A1* | 10/2015 | Brinkmeyer | G01S 17/32 |
| | | | | 250/227.23 |

FOREIGN PATENT DOCUMENTS

| | | | |
|---|---|---|---|
| JP | H07-325152 A | 12/1995 | |
| JP | H09-264949 A | 10/1997 | |
| JP | 2005-106603 A | 4/2005 | |
| WO | 2013/127973 A1 | 9/2013 | |

OTHER PUBLICATIONS

International Search Report issued in Application No. PCT/JP2017/002435 dated Apr. 4, 2017, with English translation.

\* cited by examiner

DISTANCE MEASUREMENT DEVICE

CROSS REFERENCE TO RELATED APPLICATIONS

This application is a U.S. continuation application of PCT International Patent Application Number PCT/JP2017/002435 filed on Jan. 25, 2017, claiming the benefit of priority of Japanese Patent Application Number 2016-016691 filed on Jan. 29, 2016, the entire contents of which are hereby incorporated by reference.

BACKGROUND

1. Technical Field

The present disclosure relates to a distance measurement device.

2. Description of the Related Art

Distance measurement devices that measure the distance to a measurement target by measuring the time from when electromagnetic waves are transmitted to when the electromagnetic waves are reflected by the target and received are conventionally known. As an example, there is the time of flight (TOF) method of measuring the distance to an object by emitting light from the vicinity of a distance measurement device to an object, and measuring the time until reflected light reflected by the object returns to the distance measurement device. In the TOF method, the distance to a distant object can be measured with high resolution by increasing the intensity of light from the light source.

For example, in an environment where distance measurement devices are present alongside each other, there is the problem that the measurement of electromagnetic waves transmitted by a device is interfered with by electromagnetic waves emitted by another device or by reflected waves of electromagnetic waves emitted from another device which are reflected by the measurement target, and thus the distance to the measurement target cannot be correctly measured. In response to this problem, in a pulse wave radar device disclosed in Japanese Unexamined Patent Application Publication No. 2005-106603, a pseudorandom code is generated for the electromagnetic wave to be emitted to the target, and this is converted into a pulse train having a particular duty, and transmitted. Accordingly, since the electromagnetic wave pattern in each pulse period becomes a pattern that follows the pseudorandom code by each device, the pulse wave radar device can reduce interference between a plurality of devices.

SUMMARY

However, just the use a pseudorandom code as in Japanese Unexamined Patent Application Publication No. 2005-106603 produces insufficient interference reduction effect. To enhance interference immunity by using a pseudorandom code, an overly large number of bits are needed. As such, there is the problem that the number of pulses emitted becomes big and thus measurement takes time.

In view of the aforementioned problems, the present disclosure has as a main object to obtain a distance measurement device having excellent interference immunity.

A distance measurement device according to an aspect of the present disclosure includes: a pulse light emitter that emits pulse light to a measurement target; an optical sensor that receives reflected light which is the pulse light reflected by the measurement target; a controller that controls a light emission timing of the pulse light emitted by the pulse light emitter, and determines a distance to the measurement target, from a light reception timing of the reflected light detected by the optical sensor, wherein the controller sets the light emission timing in each of N periods selected randomly from continuous K periods to a timing that is delayed by a first time from a start time of the period, N being a natural number less than K, K being a natural number greater than or equal to 2, the first time being random.

Accordingly, since the light emission timing of pulse light is set to a timing that is delayed by a random first time from the start time of each period, it is possible to reduce mutual interference in an environment where, for example, a plurality of distance measurement devices are present along each other in a measurement range of the distance measurement device.

Furthermore, a light emission pattern of the pulse light emitted by the pulse light emitter may be configured by a pseudorandom code.

Accordingly, a code which has a particular period and randomness within the period makes it is possible to reduce mutual interference in an environment where, for example, a plurality of distance measurement devices are present along each other in a measurement range of the distance measurement device.

Furthermore, the controller may include a random delay generator that sets the light emission timing to the timing that is delayed by the first time from the start time of each period, with respect to the light emission pattern configured by the pseudorandom code.

Accordingly, the first time can be appropriately set by the random delay generator.

Furthermore, the controller may include a code spreader that generates the pseudorandom code.

Accordingly, an appropriate pseudorandom code can be generated by the code spreader.

Furthermore, a code sequence of the pseudorandom code may change randomly for each distance to be measured (also referred to hereafter as measurement distance).

Accordingly, a different pseudorandom code can be used for each measurement distance.

Furthermore, a code sequence of the pseudorandom code may change randomly for each frame which is a time period over which a single measurement is completed.

Accordingly, a different pseudorandom code can be used for each frame.

Furthermore, when a time from light emission to light reception of the pulse light corresponding to a maximum measurable distance over which reflected light, which is the pulse light emitted by the pulse light emitter that is reflected by the measurement target, can be received by the optical sensor is a second time, the light emission timing of the pulse light in a first period may be a timing in which at least the second time is secured between an end of the light emission of the pulse light in the first period and a start of a second period following the first period.

Accordingly, reception of pulse light of a first period by mistake in a second period following the first period can be suppressed.

Furthermore, when a time from light emission to light reception of the pulse light corresponding to a maximum measurable distance over which reflected light, which is the pulse light emitted by the pulse light emitter that is reflected by the measurement target, can be received by the optical sensor is a second time, a third time, from a start of a first period to a start of a second period following the first period, may be less than or equal to the second time by at least a time obtained by dividing the second time by the K periods.

Accordingly, since the pulse light for the second period can be emitted without having to wait for the roundtrip time of light emitted in the currently-measured first period, measurement time can be shortened.

According to the present disclosure, a distance measurement device having excellent interference immunity can be realized.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT (Underlying Knowledge Forming Basis of the Present Disclosure)

First, the underlying knowledge forming the basis of the present disclosure will be described.

As described above, in an environment where a plurality of distance measurement devices are present alongside each other, as in the case where a distance measurement device is provided in each of a plurality of vehicles, for example, there is the problem that the measurement of electromagnetic waves transmitted by a device is interfered with by electromagnetic waves emitted by another device or by reflected waves of electromagnetic waves emitted from another device which are reflected by the measurement target, and thus the distance to the measurement target cannot be correctly measured.

Figure 5:
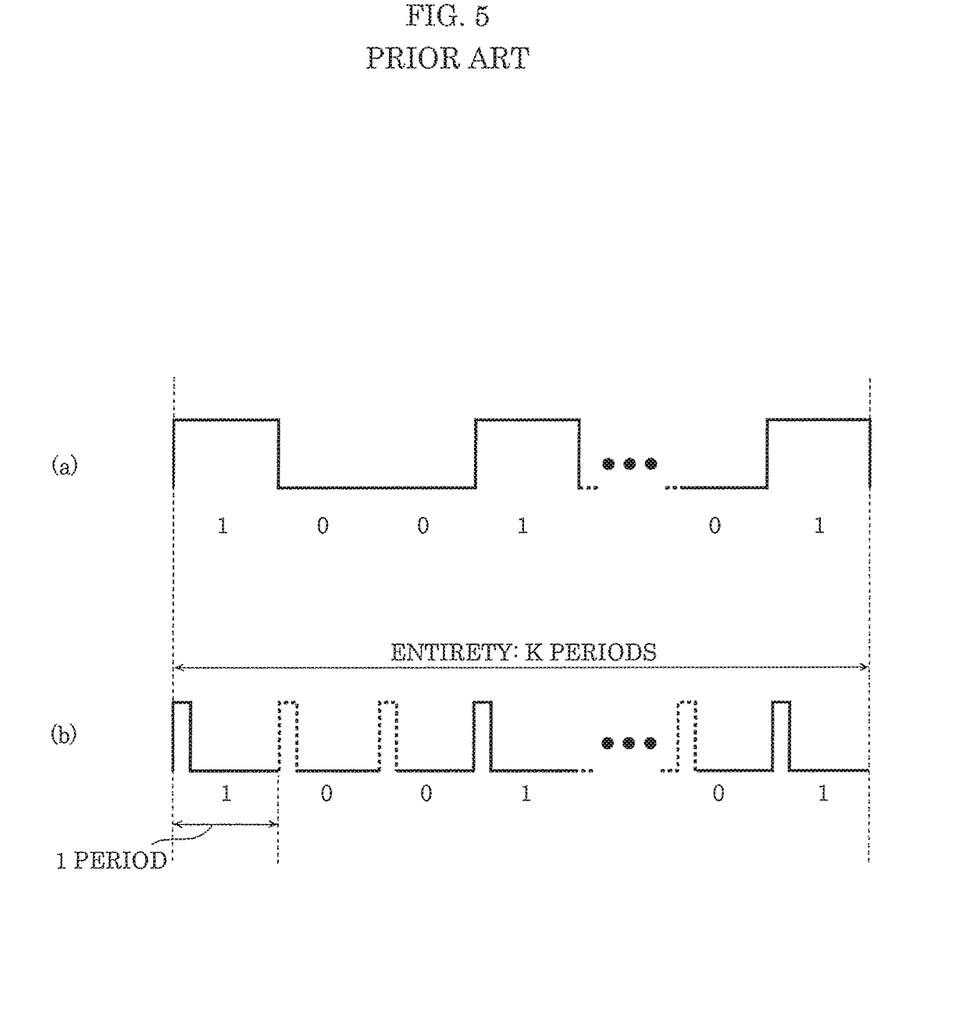
FIG. 5 illustrates timing charts for describing pulse waves emitted by a pulse wave radar according to a conventional technique, where (a) is an example of a timing chart of a pseudorandom code, and (b) is an example of a timing chart of a pulse train based on the pseudorandom code.

FIG. 5 is a diagram for describing pulse waves emitted by the pulse wave radar device disclosed in Japanese Unexamined Patent Application Publication No. 2005-106603. In the pulse wave radar device disclosed in Japanese Unexamined Patent Application Publication No. 2005-106603, the pseudorandom code illustrated in (a) in FIG. 5 is generated, and, as illustrated in (b) of the figure, this is converted to a pulse train having a particular duty and transmitted. Accordingly, since emission or non-emission of light in the respective pulse periods becomes a pattern that follows the pseudorandom code according to each device, interference between devices can be reduced.

However, just the use of the above-described pseudorandom code produces insufficient interference reduction effect. Therefore, in order to enhance interference immunity, an overly large number of code bits become necessary. As such, there is the problem that the number of pulses emitted becomes big and thus measurement takes time.

According to the subsequently-described distance measurement device, it is possible to reduce mutual interference while reducing measuring time in an environment where, for example, a plurality of distance measurement devices are present alongside each other within the measuring range of the distance measurement device.

Hereinafter, exemplary embodiments of the present disclosure will be specifically described with reference to the drawings. Substantially identical components are assigned the same reference signs, and there are instances where description is omitted. It should be noted that each of the subsequently-described exemplary embodiments show a specific example. The numerical values, shapes, materials, structural components, the arrangement and connection of the structural components, steps, the processing order of the steps, etc. shown in the following exemplary embodiments are mere examples, and are not intended to limit the scope of the present disclosure. Furthermore, among the structural components in the following exemplary embodiments, components not recited in any one of the independent claims which indicate the broadest concepts are described as arbitrary structural components.

Embodiment 1

Figure 1:
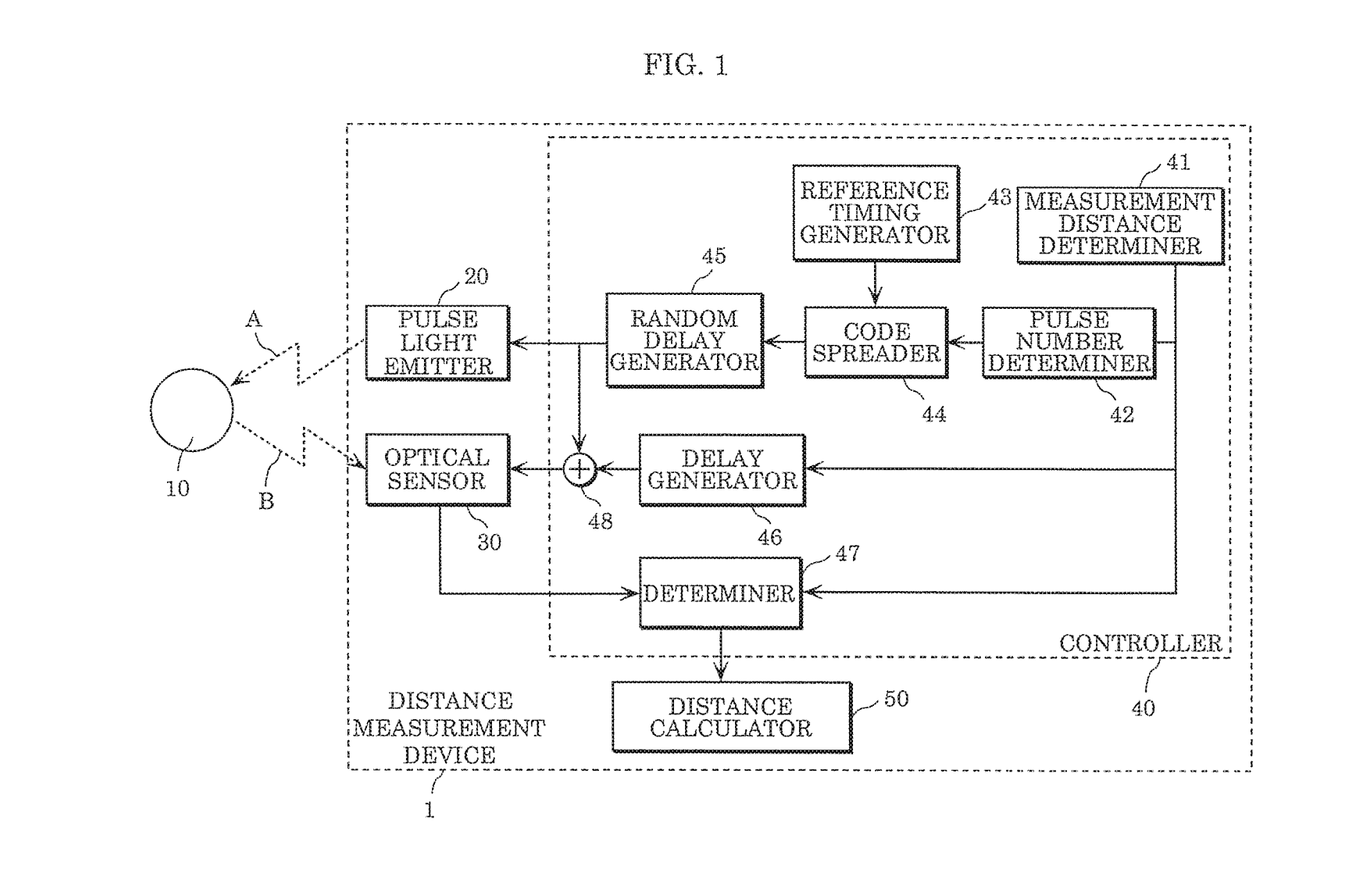
FIG. 1 is a block diagram of a distance measurement device according to Embodiment 1.
Figure 2:
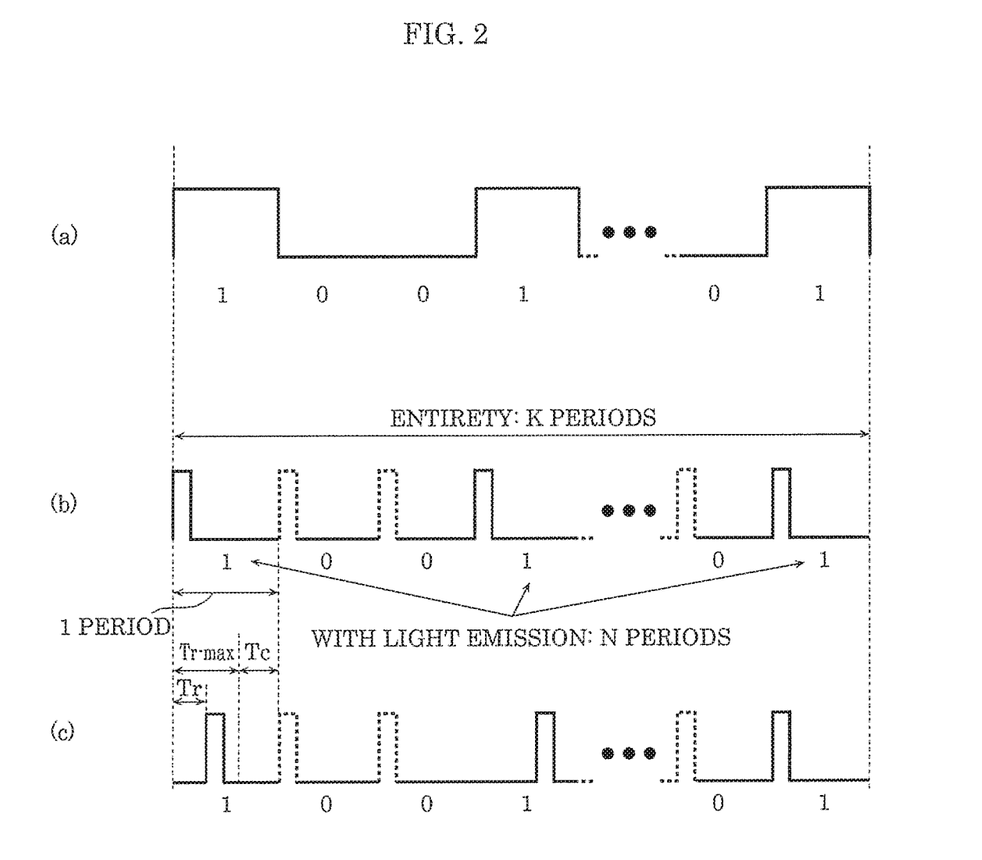
FIG. 2 illustrates timing charts indicating signal timing for the distance measurement device in Embodiment 1, where (a) is an example of a timing chart of a pseudorandom code according to the present disclosure, (b) is an example of a timing chart of a pulse train based on the pseudorandom code, and (c) is an example of a timing chart of a pulse train to which delay time Tr is added.

FIG. 1 is a block diagram of distance measurement device 1 according to Embodiment 1. FIG. 2 is a diagram for describing timing charts of a pseudorandom code and pulse trains in Embodiment 1, where (a) is an example of a timing chart of a pseudorandom code according to the present disclosure, (b) is an example of a timing chart of a pulse train based on the pseudorandom code, and (c) is an example of a timing chart of a pulse train to which delay time Tr is added.

Distance measurement device 1 is a device that measures the distance to measurement target 10 using light. Distance measurement device 1 segments a measurement range set by a user into two or more segments, and performs a distance measurement operation for each of the segmented measurement distances (the measurement distance corresponds to the distance to be measured in the present disclosure). At this time, pulse light for the next measurement is emitted after the elapse of time over which pulse light emitted for the currently-measured measurement distance makes a round trip.

As illustrated in FIG. 1, distance measurement device 1 includes pulse light emitter 20, optical sensor 30, controller 40, and distance calculator 50. Controller 40 includes measurement distance determiner 41, pulse number determiner 42, reference timing generator 43, code spreader 44, random delay generator 45, delay generator 46, determiner 47, and adder 48.

Measurement target 10 is, for example, a person, animal, object, etc., present outside a vehicle.

Pulse light emitter 20 is, for example, a light source that emits near-infrared light. Pulse light emitter 20 emits pulse light toward measurement target 10 at a predetermined timing, based on a control signal from random delay generator 45 of controller 40.

Optical sensor 30 is, for example, an imaging camera in which a plurality of light-receiving elements capable of receiving near-infrared light are arranged in rows and columns. Optical sensor 30 receives, at a predetermined timing, reflected light which is the pulse light emitted by pulse light emitter 20 that is reflected by measurement target 10, based on a control signals from random delay generator 45 and delay generator 46 of controller 40.

In controller 40, measurement distance determiner 41 segments the measurement range set by a user into two or more segments, and the distance measurement operation is performed for each of the segmented measurement distances. The number of segments and the size of the segments may be determined each time by the user or may be set in advance.

Furthermore, as illustrated in (a) in FIG. 2, for each of the segmented measurement distances, pulse number determiner 42 determines the number of pulses N, that is, N periods (N being a natural number less than K to be described later) required in accordance with the measurement distance.

Reference timing generator 43 generates a reference timing (period) for the pulse light to be used in the distance measurement. This reference timing is set to be greater than or equal to the sum (Tc+Tr_max) of (i) round trip time Tc of light from light emission to light reception, corresponding to the maximum measurable distance of distance measurement device 1, that is, the maximum measurable distance in which reflected light which is the pulse light that is reflected by the measurement target can be received, and (ii) time Tr_max to be described later. Specifically, the emission timing of pulse light in a particular period (first period) is a timing that secures at least time Tc between the end of the emission of pulse light in the particular period and the start of the next period (second period) following the particular period. This is to prevent the pulse light of the previous period from being received by mistake. It should be noted that delay time Tr corresponds to a first time in the present disclosure. Time Tc corresponds to a second time in the present disclosure. As an example, Tc=2 μsec.

Code spreader 44 determines K periods (K being a natural number greater than or equal to 2) which are the time periods required for the distance measurement operation for a segmented measurement distance. As an example, where n is the smallest integer that satisfies $N \leq 2^{(n-1)}$, $2^n-1$ can be set as K.

Code spreader 44 generates a pseudorandom code having a code length of K periods as the emission pattern of pulse light to be outputted by pulse light emitter 20. A pseudorandom code refers to a code which has a specific period and is reproducible, but has randomness within the period. For example, a pseudorandom code is a code used in processing for spectrum spreading, etc., in a spread spectrum communication system.

For the pseudorandom code, an arbitrary code such as M-sequence code and gold sequence code may be used. A unique code may be assigned to each distance measurement device 1, but the pseudorandom code may be randomly assigned on a frame basis or a measurement distance basis. It should be noted that a frame refers to the time period over which one distance measurement is completed. In other words, a frame refers to the time period over which the measurement of all of the segmented measurement distances is completed. Furthermore, the code length of the pseudorandom code may be changed in accordance with the number of pulses of pulse light required for each distance. For example, by adopting a configuration in which a bit stream of 0s and 1s of the generated PN code is assigned to indicate pulse light emission/non-emission for each reference timing, with no emission of pulse light for a 0 and emission of pulse light for a 1, the pseudorandom code can be represented by the light emission pattern of pulse light. It should be noted that the pseudorandom code may be represented using a pattern in which pulse light is emitted for a 0 and pulse light is not emitted for a 1.

With regard to the pseudorandom code light emission pattern for each reference timing, random delay generator 45 generates a random delay for each pulse light of each reference timing. With regard to the pseudorandom code light emission pattern illustrated in (b) in FIG. 2, random delay generator 45 generates a random delay time Tr for each reference timing section, and determines a final pulse light emission timing. Delay time Tr occurs within a range (Tr≤Tr_max) that does not exceed maximum value Tr_max which is set in advance.

Accordingly, the light emission timing of the pulse light from pulse light emitter 20 is set to a timing that is delayed by a random delay time Tr from the start of each of N periods randomly selected from the continuous K periods. It should be noted that delay time Tr corresponds to a first time in the present disclosure.

Pulse light emitter 20 emits pulse light based on the pulse light emission timing set by way of the above-described process.

In addition, for each of the segmented measurement distances, delay generator 46 obtains the time it takes for light to complete a round trip for the measurement distance, and generates a pulse light reception timing by adding such a roundtrip time's worth of delay time to the pulse light emission timing determined by random delay generator 45.

Determiner 47 determines, from the number of signals obtained by optical sensor 30 and the measurement distance notified by measurement distance determiner 41, whether measurement target 10 is present in the currently-measured measurement distance. Specifically, determiner 47 determines whether the number of signals obtained by optical sensor 30 exceeds a separately determined threshold, and, when the number of signals obtained by optical sensor 30 exceeds the threshold, notifies the result that measurement target 10 is present in the currently-measured measurement distance notified by measurement distance determiner 41 to distance calculator 50. When the number of signals obtained by optical sensor 30 does not exceed the threshold, determiner 47 continues to determine whether the number of signals obtained by optical sensor 30 exceeds the threshold. It should be noted that determiner 47 may include a storage that stores the result.

Adder 48 adds the signals generated by random delay generator 45 and delay generator 46, and outputs the result to optical sensor 30. The timing of the signals outputted to optical sensor 30 is called the pulse light reception timing.

Distance calculator 50 calculates the distance to measurement target 10, from the result indicating that measurement target 10 is present in the currently-measured measurement distance notified by determiner 47. Distance calculator 50 may be, for example, a computer, etc., and the measurement result may be outputted, for example, as a control signal for controlling the brakes, speed, steering, etc., of a vehicle. Furthermore, the measurement result may be outputted to a display as distance data. Furthermore, an image may be formed and displayed from the distance data.

It should be noted that distance calculator 50 may be integrated with controller 40, or determiner 47 may also function as distance calculator 50.

When optical sensor 30 performs the receiving operation based on the pulse light reception timing, optical sensor 30 can receive the reflected light from measurement target 10 present in the measurement distance. On the other hand, optical sensor 30 does not receive reflected light from an object present at a distance other than the currently-measured measurement distance because, as described above, a timing which secures at least time Tc between the end of the emission of pulse light in the preceding period and the start of the currently-measured period is set for the light emission timing of pulse light in the currently-measured period. In addition, the probability that optical sensor 30 will receive pulse light emitted by another distance measurement device 1 can be reduced because the pulse light emission timing includes a timing based on a different pseudorandom code and a random timing in which the pulse light timing is delayed by delay time Tr in one period. Therefore, by limiting the number of times receiving is performed in the reception timing by a separately determined threshold, mutual interference occurring between a plurality of distance measurement devices 1 can be reduced.

It should be noted that arbitrary L periods (L being an integer greater than or equal to 0) in which pulse light is not emitted may be added before and after the pulse pattern for the K periods of the pseudorandom code.

Furthermore, K periods may be repeated a plurality of times in the measurement time period in a particular segment. Arbitrary blank time periods may be provided between repetitions.

As describe thus far, according to distance measurement device 1 according to this embodiment, mutual interference can be reduced in an environment in which a plurality of distance measurement devices are present alongside each other within the measuring range of the distance measurement device.

Embodiment 2

Next, distance measurement device 1 according to Embodiment 2 will be described. Distance measurement device 1 according to this embodiment is different from distance measurement device 1 according to Embodiment 1 in being able to emit pulse light for the next period without waiting for the roundtrip time of light from light emission to light reception corresponding to the maximum measurable distance.

Figure 3:
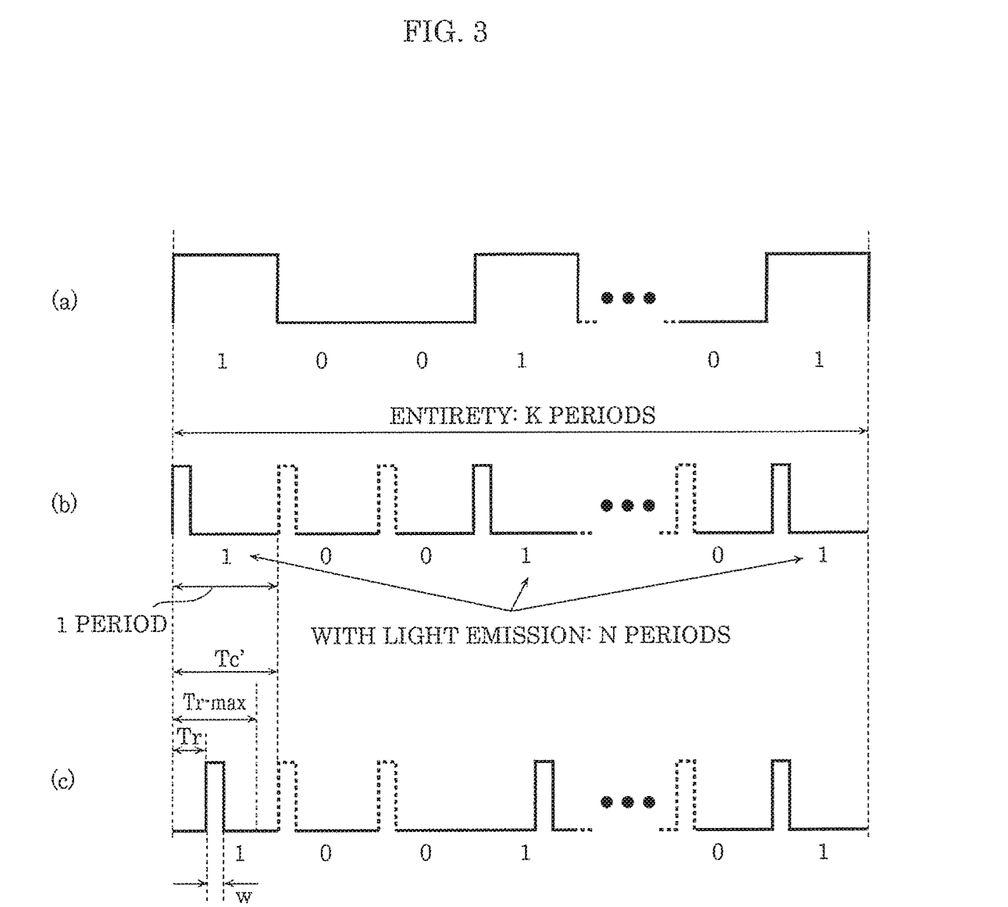
FIG. 3 illustrates timing charts indicating signal timing for the distance measurement device in Embodiment 2, where (a) is an example of a timing chart of a pseudorandom code according to the present disclosure, (b) is an example of a timing chart of a pulse train based on the pseudorandom code, and (c) is an example of a timing chart of a pulse train to which delay time Tr is added.

The configuration of distance measurement device 1 according to Embodiment 2 is the same as the configuration of distance measurement device 1 illustrated in FIG. 1. FIG. 3 is a diagram illustrating examples of timing charts for describing timing charts of a pseudorandom code and pulse trains according to Embodiment 2. Here, (a) is an example of a timing chart of a pseudorandom code according to the present disclosure, (b) is an example of a timing chart of a pulse train based on the pseudorandom code, and (c) is an example of a timing chart of a pulse train to which delay time Tr is added.

In controller 40, measurement distance determiner 41 segments a measurement range set by the user of distance measurement device 1 into two or more segments, and the distance measurement operation is performed for each of the segmented measurement distances, in the same manner as distance measurement device 1 in Embodiment 1. The number of segments and the size of the segments may be determined each time by the user or may be set in advance.

As illustrated in (a) in FIG. 3, for each of the segmented measurement distances, pulse number determiner 42 determines the number of pulses N, that is, N periods (N being a natural number less than K to be described later) required in accordance with the measurement distance.

Reference timing generator 43 generates a reference timing (period) for the pulse light to be used in distance measurement. The period (time Tc') of this reference timing is set to be greater than or equal to a time obtained by dividing, by K described later, a round trip time Tc of light from light emission to light reception, corresponding to the maximum measurable distance of distance measurement device 1, that is, the maximum measurable distance in which reflected light which is pulse light that is reflected by the measurement target can be received (Tc'≥+Tc/K). As described later, this is to prevent pulse light of the previous K period from being received by mistake. It should be noted that time Tc corresponds to a second time in the present disclosure. Time Tc' corresponds to a third time in the present disclosure. As an example, where K=30, time Tc'=60 nsec approximately.

Code spreader 44 determines K periods which are the time periods required for the distance measurement operation of a segmented measurement distance (K being a natural number greater than or equal to 2). As an example, where n is the smallest integer that satisfies N≤$2^{(n-1)}$, $2^n-1$ can be set as K. Code spreader 44 generates a pseudorandom code having a code length of K periods. For the pseudorandom code, an arbitrary code such as M-sequence code and gold sequence code may be used. A unique code may be assigned to each distance measurement device 1, but the pseudorandom code may be randomly assigned on a frame basis or a segmented measurement distance basis. Furthermore, the code length of the pseudorandom code may be changed in accordance with the number of pulses of pulse light required for each distance. For example, by adopting a configuration in which a bit stream of 0s and 1s of the generated PN code is assigned to indicate pulse light emission/non-emission for each reference timing, with no emission of pulse light for a 0 and emission of pulse light for a 1, the pseudorandom code can be represented by the light emission pattern of pulse light. It should be noted that the pseudorandom code may be represented using a pattern in which pulse light is emitted for a 0 and pulse light is not emitted for a 1.

With regard to the pseudorandom code light emission pattern for each reference timing, random delay generator 45 generates a random delay for each pulse light of each reference timing. With regard to the pseudorandom code light emission pattern illustrated in (b) in FIG. 3, random delay generator 45 generates a random delay time Tr for each reference timing section, and determines a final pulse light emission timing. Delay time Tr occurs within a range (Tr≤Tr_max) that does not exceed maximum value Tr_max which is set in advance.

Accordingly, the light emission timing of the pulse light from pulse light emitter 20 is set to a timing that is delayed by a random delay time Tr from the start of each of N periods randomly selected from the continuous K periods.

Pulse light emitter 20 emits pulse light based on the pulse light emission timing determined by way of the above-described process.

In addition, for each of the segmented measurement distances, delay generator 46 obtains the time it takes for light to complete a round trip of the measurement distance, and generates a pulse light reception timing by adding such roundtrip time's worth of delay time to the pulse light emission timing determined by random delay generator 45.

Since determiner 47, adder 48, and distance calculator 50 performs the same operations as in distance measurement device 1 according to Embodiment 1, detailed description is omitted.

When optical sensor 30 performs the receiving operation according to this pulse light reception timing, optical sensor 30 can receive the reflected light from the measurement target present in the measurement distance.

On the other hand, since the delay time provided in accordance with the distance is random, the probability that optical sensor 30 receives reflected light from an object present at a distance other than the currently-measured measurement distance at the same timing as its own reflected light can be reduced. Therefore, the signals from reflected light from an object present at a distance other than the currently-measured measurement distance becomes sufficiently fewer signals compared to the signals obtained for the currently-measured distance. As such, since the probability that optical sensor 30 receives reflected light from an object present at a distance other than the currently-measured measurement distance can be reduced, mutual interference occurring between a plurality of distance measurement devices 1 can be reduced.

Figure 4:
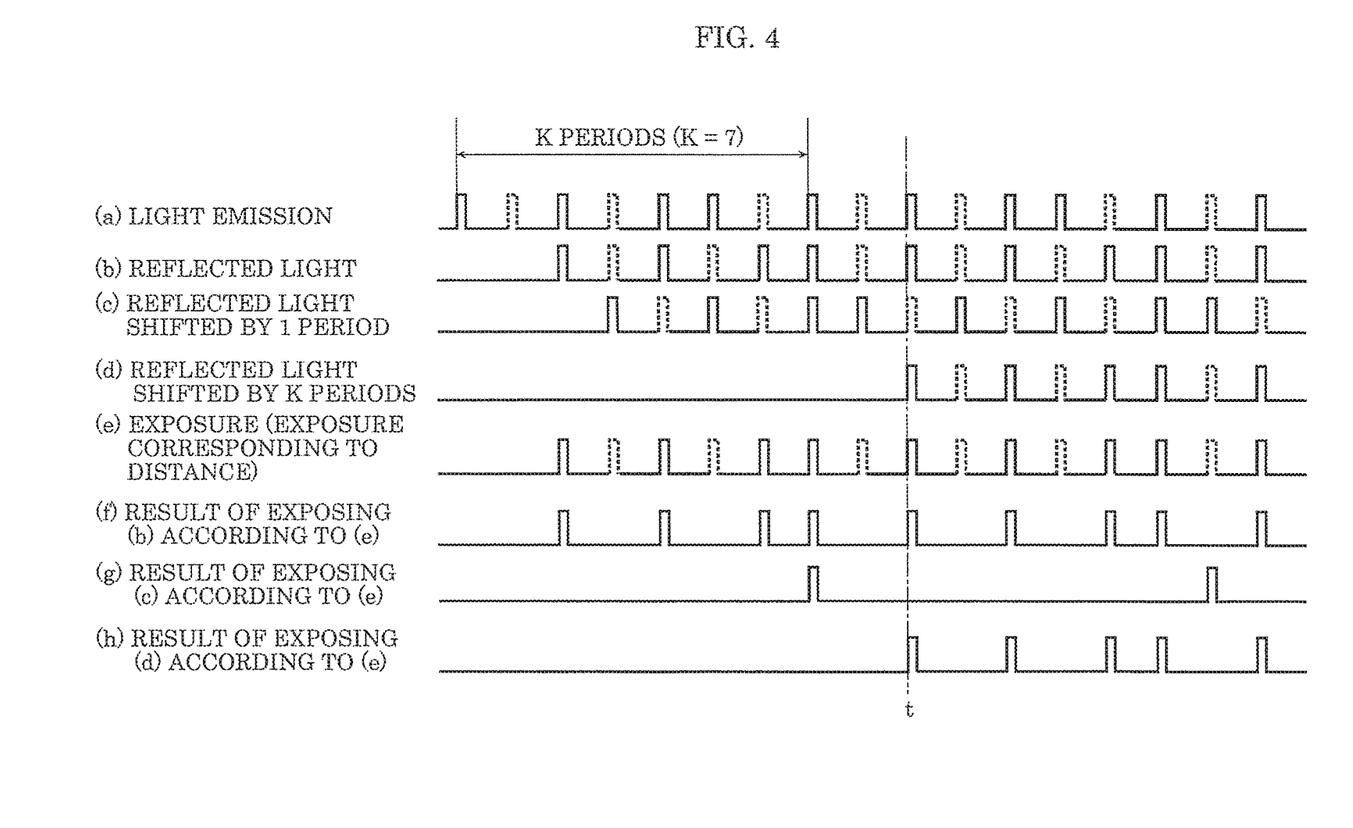
FIG. 4 is a diagram for describing the difference in the number of signals obtained according to the relative timing between the reflected light timing and the exposure timing, in the case where K=7 and N=4.

This operation will be described using FIG. 4. FIG. 4 is a diagram for describing the difference in the number of signals obtained according to the relative timing between the reflected light timing and the exposure timing in the case where K=7 and N=4. In FIG. 4, with regard to the timing of pulse trains based on a pseudorandom code: (a) indicates light emission, (b) indicates reflected light, (c) indicates reflected light shifted by one period, (d) indicates reflected light shifted by K periods, (e) indicates an exposure timing corresponding to the measurement distance, (f) indicates the result of when reflected light is exposed at the exposure timing corresponding to the measurement distance, (g) indicates the result when reflected light that is shifted by one period is exposed at the exposure timing corresponding to the measurement distance, and (h) indicates the result when reflected light that is shifted by K periods is exposed at the exposure timing corresponding to the measurement distance.

When the reflected light ((b) in FIG. 4) corresponding to the light emission pulse of (a) in FIG. 4 is exposed according to the same timing as reflected light ((e) in FIG. 4), 4 signals per K periods are obtained.

On the other hand, for reflected light shifted by 1 period with respect to the same exposure timing (reflected light from an object present at a distance farther than the currently-measured measurement distance), illustrated in (c) in FIG. 4, 1 signal per K periods is received as represented by (g) in FIG. 4.

As described above, by using pseudorandom code, a signal that is period-shifted by less than K periods results in a smaller number of signals compared to the original signal, and thus the probability for misdetermining distance can be reduced.

Furthermore, as represented by (h) in FIG. 4, for a period-shift of K periods, 4 signals per K periods, that is, the same number of signals as the original signal is received,
and thus the reflected light in (b) in FIG. 4 and the reflected light shifted by K periods in (d) in FIG. 4 cannot be distinguished. As such, in distance measurement device 1 according to the present disclosure, in order that reflected light shifted by K periods or more is not received, the time for K periods is set to a time that is greater than or equal to time Tc, that is, time Tc' of 1 period is set to a time (Tc'≥Tc/K) which is greater than or equal to a time obtained by dividing Tc by K. Furthermore, time Tc' of 1 period is set to a time that is less than or equal to time Tc. It should be noted that, where the light emission time of pulse light is w, maximum delay time Tr_max is Tr_max≤Tc'-w, and delay time Tr is Tr≤Tr_max.

Accordingly, distance measurement device 1 can emit pulse light for the next period without having to wait for the roundtrip time of light from light emission to light reception corresponding to the maximum measurable distance, and thus measurement time can be shortened.

In addition, the probability that optical sensor 30 will receive pulse light emitted by another distance measurement device can be reduced because the pulse light emission timing includes a timing based on a different pseudorandom code and a random timing in which the pulse light timing is delayed by delay time Tr in one period. Therefore, by limiting the number of times receiving is performed in the reception timing by a separately determined threshold, mutual interference occurring between a plurality of distance measurement devices 1 can be reduced.

It should be noted that arbitrary L periods (L being an integer greater than or equal to 0) in which pulse light is not emitted may be added before and after the pulse pattern for the K periods of the pseudorandom code.

Furthermore, K periods may be repeated a plurality of times in the measurement time period in a particular segment. Furthermore, arbitrary blank time periods may be provided between repetitions.

As describe thus far, according to distance measurement device 1 according to this embodiment, for example, mutual interference can be reduced in an environment in which a plurality of distance measurement devices are present alongside each other within the measuring range of the distance measurement device. Furthermore, since the pulse light for the next period can be emitted without having to wait for the roundtrip time of light emitted in a particular period currently-measured, measurement time can be shortened.

Embodiment 3

Next, distance measurement device 100 according to Embodiment 3 will be described. Distance measurement device 100 according to this embodiment is different from distance measurement device 1 in Embodiments 1 and 2 in determining the presence/absence of an object after performing distance measurement a plurality of times on one measurement distance. Accordingly, even when interference occurs, detection due to interference can be determined as being as a misdetection, and thus reliability can be further improved.

Figure 6:
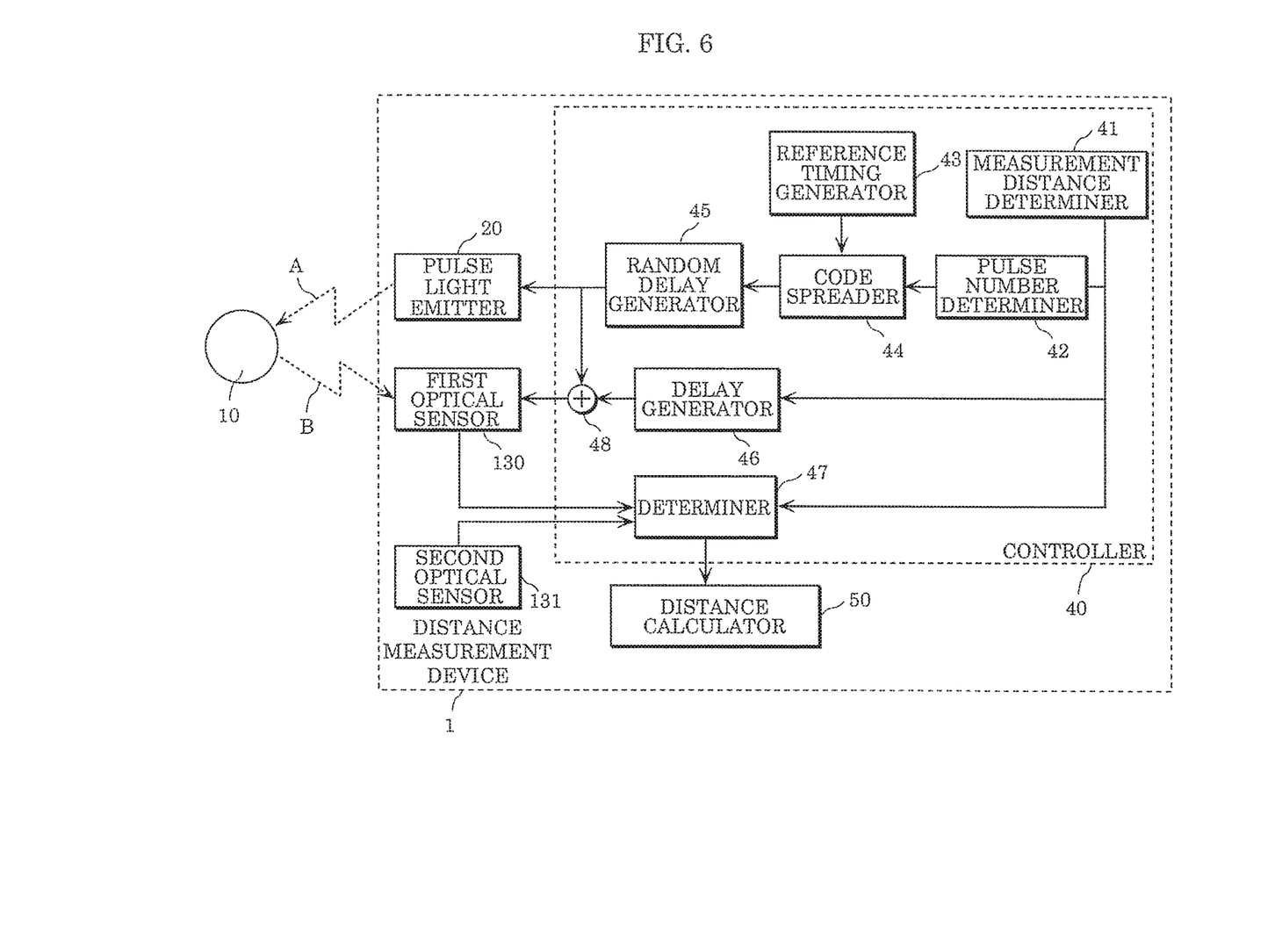
FIG. 6 is an example of a configuration of a distance measurement device according to Embodiment 3.

FIG. 6 is an example of a configuration of distance measurement device 100 according to this embodiment.

As illustrated in FIG. 6, distance measurement device 100 includes pulse light emitter 20, first optical sensor 130, second optical sensor 131, controller 40, and distance calculator 50. Controller 40 includes measurement distance determiner 41, pulse number determiner 42, reference timing generator 43, code spreader 44, random delay generator 45, delay generator 46, determiner 47, and adder 48.

First optical sensor 130 has the same configuration as sensor 30 illustrated in FIG. 1.

Second optical sensor 131 receives, at a predetermined timing different from that of first optical sensor 130, reflected light which is the light emitted by pulse light emitter 20 which is reflected by measurement target 10, based on the control signals from random delay generator 45 and delay generator 46 of controller 40. The rest of the configuration is the same as in first optical sensor 130.

Since the components other than first optical sensor 130 and second optical sensor 131 are the same as the components of distance measurement device 1 illustrated in FIG. 1, detailed description thereof shall be omitted.

It should be noted that although FIG. 6 illustrates a configuration in which a plurality of optical sensors (first optical sensor 130 and second optical sensor 131) are included, the configuration is not limited to such, and distance measurement may be performed a plurality of times by a single optical sensor.

Figure 7:
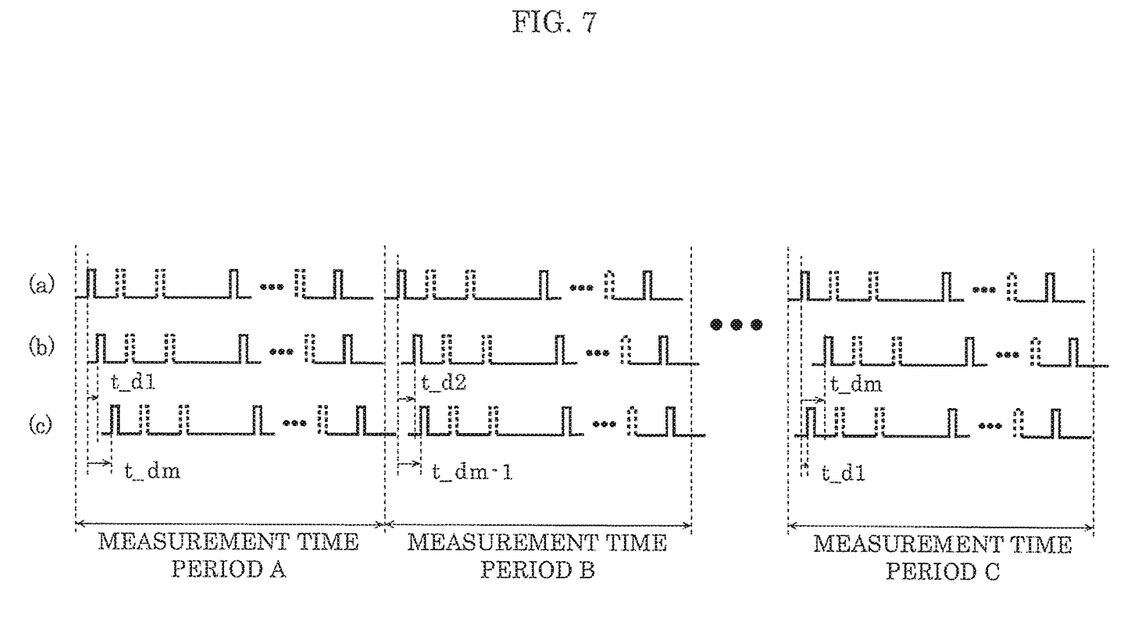
FIG. 7 is a diagram for describing an example of a timing chart for a distance measurement device according to Embodiment 3.

FIG. 7 is a diagram for describing examples of timing charts for distance measurement device 100 according to this embodiment. In FIG. 7, (a) indicates light emission, (b) indicates the exposure timing for first optical sensor, and (c) indicates the exposure timing for second optical sensor. Furthermore, in FIG. 7, measurement time period A is the measurement time period for measurement distance d1 and measurement distance dm, measurement time period B is the measurement time period for measurement distance d2 and measurement distance dm−1, and measurement time period C is the measurement time period for measurement distance dm and measurement distance d1.

As illustrated in FIG. 7, in controller 40, measurement distance determiner 41 segments the measurement range into measurement distances d1 to dm, and the measuring operation is performed for each of the segmented measurement distances.

In the distance measurement operation, control is performed to differentiate the receiving operations corresponding to the measurement distances, that is, the exposure timings between first optical sensor 130 and second optical sensor 131.

Here, for example, first optical sensor 130 detects an object in a certain measurement distance dx. In the case where second optical sensor 131 detects an object when performing the distance measurement operation for the same measurement distance dx at a different exposure timing, determiner 47 determines that measurement target 10 is present.

On the other hand, in the case where second optical sensor 131 does not detect an object when performing the distance measurement operation for the same measurement distance dx at the different exposure timing, determiner 47 determines that a misdetection has occurred, and does not notify the measurement result to distance calculator 50.

In this manner, by including a plurality of optical sensors, distance measurement device 100 can reduce misdetections and improve reliability.

Although distance measurement devices according to one or more aspects have been described based on the foregoing exemplary embodiments, the present disclosure is not limited to these exemplary embodiments. Forms obtained by various modifications to the exemplary embodiments that can be conceived by a person of skill in the art as well as forms realized by combining structural components in different exemplary embodiments, which are within the scope of the essence of the present disclosure, may be included in one or more aspects.

For example, although the M-sequence code and gold sequence code are given as examples of the pseudorandom code in the foregoing exemplary embodiments, aside from these codes, other codes may be used.

Furthermore, although a distance measurement device including a pulse light emitter, an optical sensor, a controller, and a distance calculator is given as an example of a distance measurement device in the foregoing exemplary embodiment, it is sufficient that the distance measurement device include at least a controller, and the pulse light emitter, optical sensor, and distance calculator may be provided outside of the distance measurement device. Furthermore, the controller may be configured as an integrated circuit.

Furthermore, although a distance measurement device including a single pulse light emitter is given as an example in the foregoing exemplary embodiments, a plurality may be included.

INDUSTRIAL APPLICABILITY

The distance measurement device according to the present disclosure can be applied to a distance measurement device, a vehicle-use device for collision-prevention or autonomous driving.

What is claimed is:

1. A distance measurement device, comprising:
a pulse light emitter that emits pulse light to a measurement target;
an optical sensor that receives reflected light which is the pulse light reflected by the measurement target; and
a controller that controls a light emission timing of the pulse light emitted by the pulse light emitter, and determines a distance to the measurement target, from a light reception timing of the reflected light detected by the optical sensor, wherein
the controller sets the light emission timing in each of N periods selected randomly from continuous K periods to a timing that is delayed by a first time from a start time of the period, N being a natural number less than K, K being a natural number greater than or equal to 2, the first time being random,
a light emission pattern of the pulse light emitted by the pulse light emitter is configured by a pseudorandom code, and
the pseudorandom code has a length of K periods.

2. The distance measurement device according to claim 1, wherein the controller includes a random delay generator that sets the light emission timing to the timing that is delayed by the first time from the start time of each period, with respect to the light emission pattern configured by the pseudorandom code.

3. The distance measurement device according to claim 1, wherein the controller includes a code spreader that generates the pseudorandom code.

4. The distance measurement device according to claim 1, wherein a code sequence of the pseudorandom code changes randomly for each distance to be measured.

5. The distance measurement device according to claim 1, wherein a code sequence of the pseudorandom code changes randomly for each frame which is a time period over which a single measurement is completed.

6. The distance measurement device according to claim 1, wherein
when a time from light emission to light reception of the pulse light corresponding to a maximum measurable distance over which reflected light, which is the pulse light emitted by the pulse light emitter that is reflected by the measurement target, can be received by the optical sensor is a second time, the light emission timing of the pulse light in a first period is a timing in which at least the second time is secured between an end of the light emission of the pulse light in the first period and a start of a second period following the first period.

7. The distance measurement device according to claim 1, wherein when a time from light emission to light reception of the pulse light corresponding to a maximum measurable distance over which reflected light, which is the pulse light emitted by the pulse light emitter that is reflected by the measurement target, can be received by the optical sensor is a second time, a third time, from a start of a first period to a start of a second period following the first period, is less than or equal to the second time by at least a time obtained by dividing the second time by the K periods.

* * * * *